Oct. 26, 1943.    W. L. HANSEN ET AL    2,332,634
BEARING
Filed Jan. 27, 1942
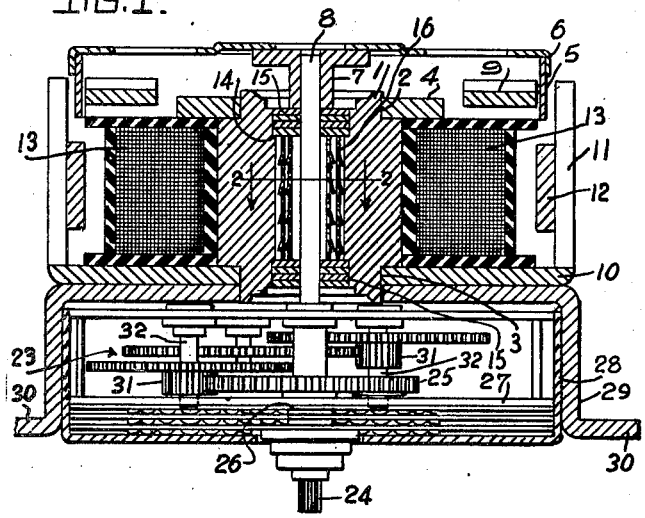
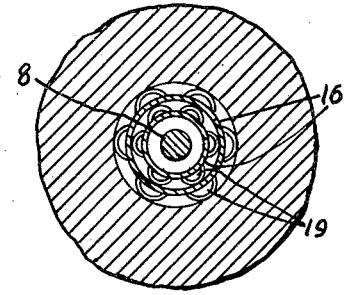
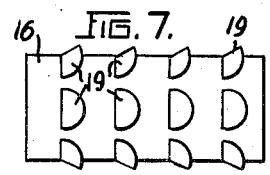
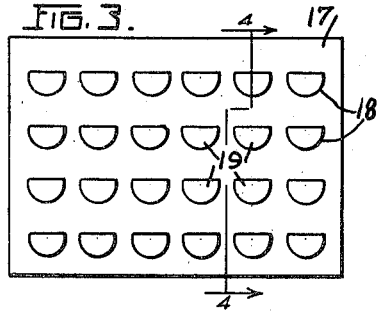
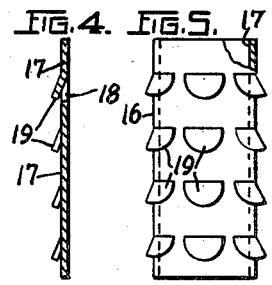
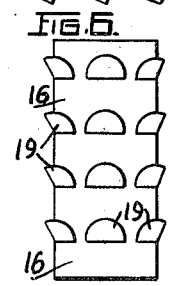
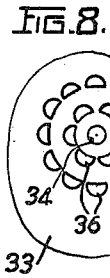
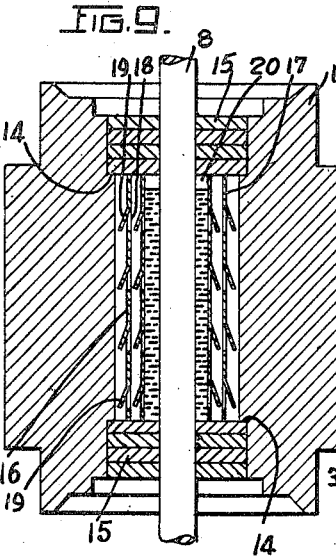
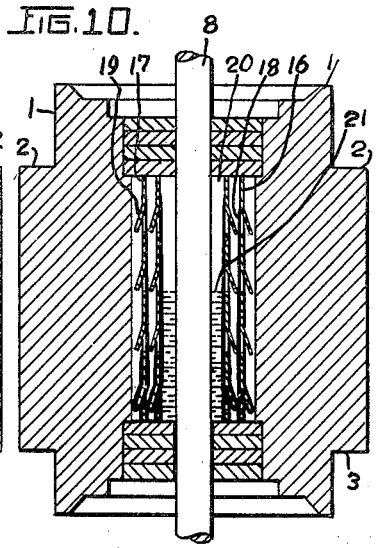
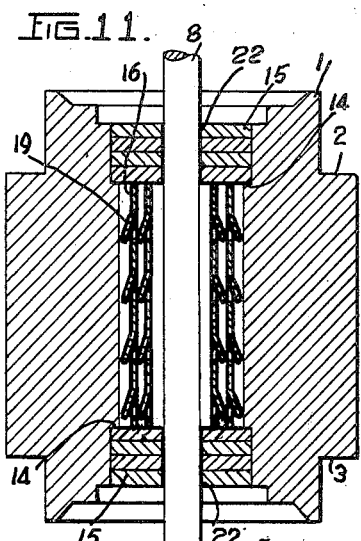
Inventors
WILLIAM L. HANSEN,
IRA N. HURST,
JOHN E. JOHNSON,
Attorneys Patented Oct. 26, 1943

2,332,634

UNITED STATES PATENT OFFICE 2,332,634

BEARING

William L. Hansen, Ira N. Hurst, and John E. Johnson, Princeton, Ind., assignors to Hansen Manufacturing Company, Inc., Princeton, Ind., a corporation of Indiana Application January 27, 1942, Serial No. 428,417

10 Claims. (Cl. 308—134.1)

The present invention relates to lubricating systems and apparatus and more particularly to oil retainers suitable for bearings, shafts, gearing, etc.

In the lubrication of rotating or reciprocating parts it has been customary to employ absorbent material such as felt packing saturated with oil which bears against the moving parts in order to transfer oil thereto. However, material of this character varies as to its absorbent and wearing properties so that its lubricating function cannot be judged altogether accurately. The felt material often becomes dry over a period of time through depletion or evaporation of the oil and takes on a hardened, glazed surface which may mar the surface of the moving part and in any case would prevent further flow of lubricating fluid.

The primary object of the present invention is to provide an oil retainer or bearing which is made completely out of metal and requires no felt or other absorbent material.

Another object is to provide an oil retainer suitable for flat or round bearing surfaces and having a relatively long oil retaining life, giving up its oil at exactly the rate required by the bearing and at no faster or less rate.

These objects are attained in brief by providing surfaces about the bearing which, by reason of their shape, lend themselves to capillary attraction and retention of oil in considerable quantities. The oil is readily given up to any moving part by reason of a reverse capillary movement induced by the dryness of the part.

Other objects and features will be apparent as the specification is perused in connection with the accompanying drawing.

In the drawing:

Figure 1 is a sectional view of a clock motor with the gearing in elevation showing the bearing surface of the motor shaft gearing provided with the improved oil retaining elements.

Figure 2 is an enlarged section taken along line 2—2 of Figure 1 and looking in the direction of the arrows.

Figure 3 illustrates a preliminary operation in the fabrication of the all metal oil retainer.

Figure 4 is a section taken along line 4—4 in Figure 3.

Figure 5 shows another step in the making of the oil retainer, specifically the step of bending the flat plate shown in Figure 3 into a cylindrical form in case the retainer is intended to be placed around a rotating shaft.

Figures 6 and 7 are views somewhat similar to Figure 5 but showing the oil retaining element in various positions to indicate its capability of retaining the oil without spillage and regardless of its position.

Figure 8 is a small fragmentary view showing the oil retaining structure as applied to a flat surface.

Figures 9, 10 and 11 are enlarged sectional views of a round bearing unit for a rotating shaft and indicating by the successive views the manner in which the oil flows by capillarity into the oil retaining element and is retained for future lubricating purposes.

Inasmuch as the invention pertains especially to the lubricating element which, in Figure 1, has been exemplified in connection with a clock motor, only the essential elements of the motor will be described.

In this figure, reference character 1 designates a tubular shell of magnetic material having shoulders 2, 3 provided at the opposite ends thereof. There is mounted at the upper shoulder 2 an inner pole assembly indicated at 4, this assembly comprising pole pieces which extend radially outward about the tubular member and terminate at a position just within the rotor element 5. The latter comprises a continuous steel band sprung or otherwise secured within the flanged plate member 6 which is mounted for rotation on a downwardly extending hub 7 and a shaft 8.

A shading coil indicated at 9 which may comprise an annular band of nonmagnetic material such as copper weaves in and out of the radially extending pole pieces 4, the arrangement being such that the band will extend over three sides of each alternate radial pole piece, thus shading that pole piece, but will extend only over one side of the remaining alternate pole pieces. These latter pole pieces are therefore not shaded.

The outer pole piece assembly for the motor is constituted of a plurality of radially extending pole pieces 10 which are mounted about the shoulder 3 at the lower end of the tubular element, these pole pieces being bent outwardly to provide axially extending portions 11. These vertical pole pieces define the cylindrical surface the diameter of which is slightly larger than that of the rotor 5; these pole pieces extending in an upward direction sufficient to overlap a considerable portion of the rotor. Thus the latter is adapted to rotate within an annular space formed between the outer edges of the inner pole piece assembly 4 and the inner surfaces of the outer pole piece assembly 10.

A shading ring 12 may be provided for the pole pieces 11, intertwining these pole pieces in such a manner that the ring extends over three surfaces of alternate pole pieces in order to shade these pole pieces, but extends over only one surface of the remaining alternate pole pieces.

A coil 13 to which a single phase alternating voltage is applied may be insulatingly mounted on the tubular element 1 and between the inner and outer pole piece assemblies. When this coil is energized the magnetic fields set up by the respective pole pieces at the rotor 5 and as modified by the shading rings 9, 12 cause the rotor to turn at a rate dependent on the number of pairs of pole pieces, as is well known in the art. Inasmuch as the revolutions per minute of the shaft 8 may be quite considerable, it is necessary to provide adequate lubricating facilities for that part of the shaft which enters the tubular element. For this purpose the latter is made hollow and is provided with a shoulder 14 at each end of which may rest a number, four as shown, of thrust washers 15. The upper group of washers 15 carries the weight of the rotor through the hub 7.

In the annular space between the shaft and the inner bore of the tubular element 1 there is usually inserted, according to the prior technique, a quantity of felt impregnated with oil which served as an oil reservoir for continuously lubricating the rotating shaft 8 particularly at the positions where the shaft entered the thrust washers 15. However, when an absorbent material of this character was employed, after long, continuous operation, considering the fact that the clock motor operates twenty-four hours each day, this material took on a hardened glaze which not only prevented further oil from reaching the bearing surfaces but it actually might become sufficiently hard to cause excessive friction or even to damage the shaft.

However, in accordance with the present invention there is provided an improved form of oil retaining element, one which requires no absorbent material but instead may be fabricated completely out of metal and yet will retain sufficient oil to last the motor throughout a long operating life. This oil retaining element may take on many forms and shapes depending on the character, shape and position of the bearing to be protected and also depending on whether the parts have a rotary or reciprocatory movement.

In Figure 1 the improved oil retaining element is exemplified by a pair of cylindrical members 16 concentrically arranged and positioned in the annular space normally occupied by the felt or other oil absorbent material. While these members may be made in a number of different ways, we prefer to form each member from a flat piece of metal stock, preferably of lead or, if desired, of tin hardened babbitt. The thickness of the stock will vary according to the size of the bearing, but in the case of a small clock motor, we have obtained satisfactory results using metal of approximately $\frac{1}{32}$ inch thick.

A small strip of this metal indicated at 17 (Figure 3) is first provided with semi-circular incisions 18 arranged preferably in horizontal and vertical rows, these incisions being spaced apart no greater than is necessary to preclude undue weakening of the metal strip as a whole. These incisions may be made on a quantity production basis by means of a punch press and the width of the incision should preferably be as small as possible.

The next step, as shown in Figure 4, is to bend or upset the cut portions out of the plane of the strip to form small tabs 19. The preferred angle with which these tabs extend from the main body of the metal will be explained in connection with the movement of the oil through the retaining element. In case the character of the bearing is such as to require a flat oil retaining element, the strip is left in flat form with the upset tabs as shown in Figure 4. A preferred use of an element of this character will be described as a further modification in connection with Figure 1. However, in case an oil retaining element of circular or cylindrical form is required, the flat element with upset tabs 19 is then bent, preferably around a small mandrel of predetermined size, and the adjacent edges of the strip merely brought together in abutting relation because there is no strain placed on the oil retaining element. Figures 5, 6 and 7 show the cylindrical element of this character with the tabs 19 extending outwardly from the cylindrical body 16.

Referring now to Figure 1, a pair of the cylindrical oil retaining elements 16 made in the manner described immediately above is employed, these elements being concentrically arranged and having such diameters that the outer edges of the tabs of the inner element contact with the inner cylindrical surface of the outer oil retaining element. The outer edges of the tabs of the outer oil retaining element preferably should contact with the bore of the tubular element 1. Thus both oil retaining elements are effectively held in position within the tubular element 1 even through not integrally joined to any part of the element but merely by reason of the contacts between the tabs 19 and the cylindrical surfaces of the two oil retaining elements, as can be seen in Figure 2. The length of the cylinders 16 should preferably be such as to fit snugly between the two innermost thrust washers 15.

The oil retaining and dispensing operations of the cylindrical members 16 and their integral tabs are shown in Figures 9 to 11 inclusive. The oil is usually applied to the annular space between the shaft 8 and the inner oil retaining element before the upper set of four washers 15 has been placed in position. It will be found that the oil will slowly creep through the incisions 18, then bridging the corner spaces between the edges of the tabs 19 and the cylindrical members 16, finally moving by capillary attraction over the entire surface, i. e. inner and outer surface of each tab 19, thus spreading a film of oil over all of the extended surfaces.

The rate at which the oil moves over these surfaces depends on a number of factors, but mainly on the viscosity of the oil and the angle which each tab 19 makes with its cylindrical member. The optimum angle for giving the maximum capillary movement of the oil should preferably be determined by experiment, but we have obtained satisfactory results by bending the tabs 19 at an angle of a few degrees away from the cylindrical body.

Due to the pressure head of the oil when the innermost annular space indicated at 20 (Figure 9) is filled with oil, the lower incisions are bridged with oil slightly before the upper incisions but in a few minutes it will be found that the oil has moved from all of the wet surfaces to the dry surfaces and has climbed the oil retaining elements completely to cover both sides of each tab with a uniform layer of oil. In order to hasten this action it may be feasible, although not usually necessary, to reverse the position of the tubular element 1 so that the oil will more quickly move through the incisions and along the tabs throughout that portion of the oil retaining elements which had previously been at the top.

The incised elements 16 in effect act as a sponge in that the tabs 19 and the angle at which these tabs extend from the cylindrical portion put into effect a strong absorbing action which is reversible as will be explained later, retaining the oil throughout the entire area of each cylindrical portion and ready to give up this oil when proper lubrication of the shaft 8 requires the same. In Figure 10 the level of the oil as indicated at 21 and contained in the innermost annular space is illustrated as being half depleted, whereas the lower portions of the two cylinders 16 and the tabs 19 have in effect absorbed the depleted oil.

In Figure 11 the capillary action has been entirely completed in that all the oil originally present in the inner annular space has now been spread over all of the surfaces of each oil retaining element. It has been found in practice that when the absorption operation is complete, there is positively no leakage of oil from the oil retaining elements but there is a slow movement of the oil from these elements to each bearing 22 at a rate sufficient to provide the necessary lubrication.

It is a well known phenomenon that a liquid will move from a wet to a dry surface due to molecular attraction so that as the bearings 22 become dry and in need of lubrication, these dry surfaces will cause the oil to leave the oil retaining elements at a rate sufficient to maintain the bearing surfaces wet with oil. Thus no surplus of oil will be present at the bearing surfaces to cause leakage. The fact that the oil retaining elements 16 have present thereon a sufficient film of oil has been indicated in the lower portions of the elements 16 in Figure 10 and throughout the entire surfaces of the elements in Figure 11 by the heavy black lines.

It was pointed out that the oil retaining elements should preferably be made of a lead alloy, and we have obtained satisfactory results by employing a tin hardened babbitt. This metal or alloy offers the advantage that the lead oxide reacts with the sulphur in the oil and forms a black oxide which provides superior lubricating properties.

The improved oil retaining element is not limited to a cylindrical form in which it surrounds the shaft to be lubricated, but instead is equally proficient when provided in flat form to lubricate the ends of shafts. This form of the element has also been illustrated in Figure 1.

The shaft 8 terminates in a gear train generally indicated by the reference character 23, the function of which is to give a reduction in speed from the fast moving rotor 5 to the slow moving corrugated spindle 24. The latter usually carries the minute hand of the clock so that it will rotate at one revolution per minute. The last gear 25 of the train which carries the spindle 24 is journaled at 26 in a plate member 27 which may form part of the gear casing 28. The latter is surrounded by a hollow cylindrical housing 29 which terminates in lugs 30 for mounting purposes.

The smaller gears 31 of the train may be journaled at 32 in the plate 27, the shaft projecting a slight distance just beyond the lower surface of the plate. In order to lubricate the lower ends of the shafts 32, also the cylindrical shaft 26, we may provide oil retaining elements of a flat form. In this case the plate 33 (Figure 8) of the element may be provided with openings 34, as many as there are shafts to accommodate, these openings being adapted to receive the projecting shafts.

About each opening there are one, two or more rings of tabs 36 which are bent slightly out of line with the flat plate 33, similarly to the tabs 19 of the cylindrical form of element. Several of these plates may be stacked together, three as indicated in Figure 1, and the assemblage provided with oil in any suitable manner. The stack of plates may be held in position by the gear casing 28 so that the matter of assembly is quite simple.

As the shafts 26, 32 require lubrication, oil is given up by the tabs 36, this oil tending to flow from the wet toward the dry surface due to molecular attraction or surface tension, thus maintaining the shafts in a properly lubricated condition. It has been found that the oil which is distributed throughout the tabs clings so tenaciously to the surface of the metal that the motor and gear train can be moved into any position whatever and none of the oil leaves the oil retaining unit. Only capillary attraction will cause the oil to move.

While we have described our improved oil retaining element as constituting either a cylindrical or flat metal member provided with semi-circular tabs bent out of alignment at the proper angle to promote a strong capillary effect depending on the viscosity of the oil, it will be understood that other shapes and positions of tabs or extending portions may be used to advantage, the essential construction being that corner spaces are left between the extensions and the main metal body by which to start the bridging movement of oil after which the oil continues to move by capillary effect. When these tabs are properly designed as to area and angle for a given viscosity of oil, it will be found that large quantities of oil can be stored along the surfaces thus formed, more than sufficient for the lifetime of an average clock motor, and furthermore, the oil retaining element gives up its oil completely when necessity requires.

Obviously the amount of oil thus stored depends not only on the size of the oil retaining element and number of tabs but also on the number of cylindrical or flat elements which form each unit. For the larger bearings, greater numbers of the elements 16, 33 may be required. Inasmuch as the phenomenon of capillary attraction lends itself to no particular direction except as required in moving from a dry to a wet surface or vice versa, the direction of rotation of the shaft has no effect on the proficiency with which the bearing is satisfactorily lubricated.

It will be understood that we desire to comprehend within our invention such modifications as come within the scope of the claims and the invention.

Having thus fully described our invention, what we claim as new and desire to secure by Letters Patent is:

1. An oil retaining element comprising a metal member having incisions and upset tabs extending away from the incisions at an angle with respect to the surface of the metal member said incisions providing with said tabs capillary spaces such that the movement of oil by capillarity along the upset tabs is facilitated.

2. An oil retaining element comprising a metal member with portions extending from the surface of the metal member at an angle to form crevices which may be bridged by oil due to capillary attraction, said crevices serving to store oil until needed for lubricating purposes.

3. An all metal oil retaining unit comprising a metal element having incisions of approximately semi-circular shape and portions bent out of line with the element at each incision to form semi-circular tabs, said tabs providing spaces which lend themselves to being bridged by oil due to capillary attraction.

4. An oil retaining unit comprising a metal shell over which the oil distributes itself, said shell being fabricated of a lead alloy, said metal shell being provided with portions extending from the metal shell at an angle to form crevices which may be bridged by oil due to capillary attraction, said crevices serving to store up oil until needed for lubricating purposes.

5. An oil retaining unit comprising a metal shell over which the oil distributes itself, said shell being fabricated of tin hardened babbitt, said metal shell being provided with portions extending from the metal shell at an angle to form crevices which may be bridged by oil due to capillary attraction, said crevices serving to store up oil until needed for lubricating purposes.

6. An oil retaining unit comprising a metal shell over which the oil distributes itself, said shell being fabricated of a metal which combines with the oil to provide a compound having high lubricating properties, said metal shell being provided with portions extending from the metal shell at an angle to form crevices which may be bridged by oil due to capillary attraction, said crevices serving to store up oil until needed for lubricating purposes.

7. A lubricated bearing for a shaft, said bearing comprising a tubular element surrounding the shaft and leaving an annular space between the shaft and the element, an oil retaining unit in said space, said unit including a cylindrical member of metal surrounding the shaft and provided with projections which extend from the body of the member and are adapted to retain oil by capillary attraction.

8. A lubricated bearing for a shaft, said bearing comprising a tubular element surrounding the shaft and having an annular space between the shaft and the element, an oil retaining unit in said space, said unit including a plurality of metal cylinders arranged in concentric relation and each of the cylinders being provided with projections which extend from the cylinders and are adapted to retain oil by capillary attraction, said cylinders being spaced from one another and from the tubular element by the projections.

9. A lubricated bearing for a shaft, said bearing comprising a tubular element surrounding the shaft and having an annular space between the shaft and the element, an oil retaining unit in said space, said unit including a cylindrical member of metal surrounding the shaft and provided with projections which extend from the body of the member and are adapted to retain oil by capillary attraction, said cylindrical member being held in position within the annular space solely by the contacts made between the projections and the tubular element.

10. A lubricated bearing for a shaft, said bearing comprising a flat plate of metal having an opening to receive the shaft, and provided with projections extending at an angle from said flat plate, and incisions beneath said projections, said incisions providing with said projections capillary spaces over which oil is adapted to move by capillary attraction and to distribute itself thereover, said oil being given up by the projections to the shaft by a reversal of the original capillary effect when lubrication is required.

WILLIAM L. HANSEN.
IRA N. HURST.
JOHN E. JOHNSON.